United States Patent [19]

Abaunza

[11] Patent Number: 5,271,034

[45] Date of Patent: Dec. 14, 1993

[54] SYSTEM AND METHOD FOR RECEIVING AND DECODING GLOBAL POSITIONING SATELLITE SIGNALS

[75] Inventor: John Abaunza, Goldvein, Va.

[73] Assignee: Avion Systems, Inc., Leesburg, Va.

[21] Appl. No.: 749,647

[22] Filed: Aug. 26, 1991

[51] Int. Cl.⁵ .............................................. H04K 1/00
[52] U.S. Cl. ........................................ 375/1; 342/386; 342/357
[58] Field of Search ...................... 375/1; 342/386, 357

[56] References Cited

U.S. PATENT DOCUMENTS

| | | | |
|---|---|---|---|
| 4,112,372 | 9/1978 | Holmes et al. | 375/1 |
| 4,601,005 | 7/1986 | Kilvington | 375/1 |
| 4,701,934 | 10/1987 | Jasper | 375/1 |
| 4,754,283 | 6/1988 | Fowler | 375/1 |
| 4,968,981 | 11/1990 | Sekine et al. | 375/1 |
| 4,972,431 | 11/1990 | Keegan | 375/1 |
| 5,036,330 | 7/1991 | Imae et al. | 375/1 |
| 5,036,523 | 6/1991 | Briskman | 375/1 |
| 5,081,462 | 1/1992 | Tachita et al. | 375/1 |

*Primary Examiner*—David C. Cain

[57] ABSTRACT

A system receives and demodulates spread spectrum positional signals such as those generated by a GPS satellite by frequency shifting the signals substantially to baseband and utilizing digital signal processing techniques. The digital signal processing techniques utilized can be implemented by a standard audio digital signal processor due to the circuit design. The spread spectrum signal is frequency shifted substantially to baseband, forming in-phase and quadrature components which are processed substantially in parallel. Pseudo-range, carrier phase and doppler frequency, and the underlying data are thereby derived.

57 Claims, 5 Drawing Sheets

FIG. 1
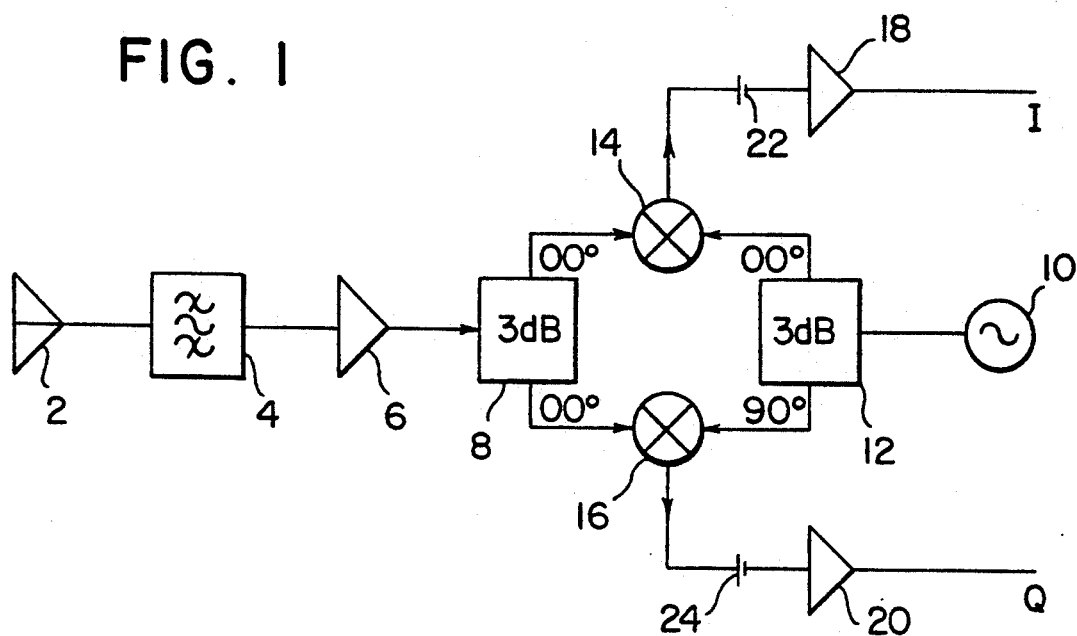
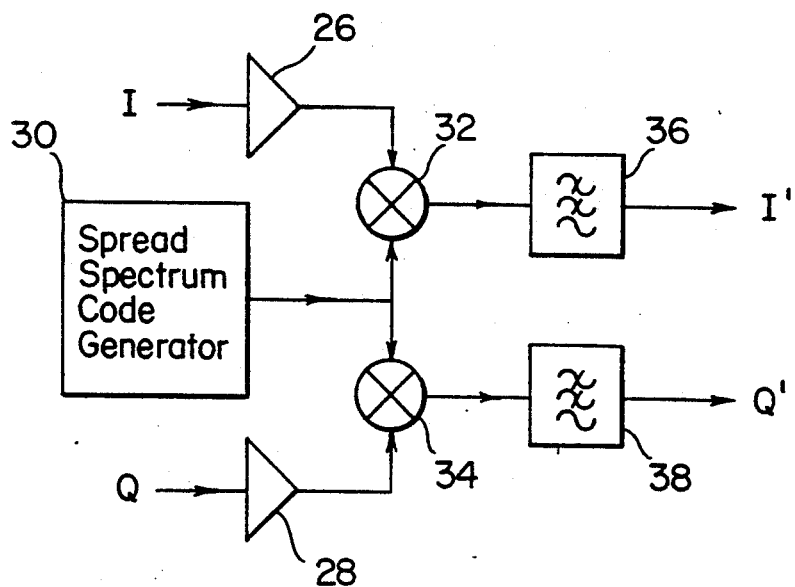
FIG. 2

SYSTEM AND METHOD FOR RECEIVING AND DECODING GLOBAL POSITIONING SATELLITE SIGNALS

FIELD OF THE INVENTION

The present invention relates to a method and system for receiving and decoding spread spectrum positional signals to derive information therefrom. More particularly, the present invention relates to method and system for receiving and decoding spread spectrum positional signals such as those developed by the Global Positioning Satellite (GPS) system and/or the Soviet Union's GLONASS navigational satellite system to derive an accurate position of the receiver.

BACKGROUND OF THE INVENTION

The Global Positioning Satellite (hereinafter "GPS") system includes a constellation of orbiting satellites which transmit coded information enabling a receiver-equipped observer to determine its own position and velocity. In the GPS system, each satellite utilizes the same fundamental carrier frequency to modulate its code encoded information bearing transmitted signal. The carrier frequency is first coded by a pseudo-random noise code uniquely identifying the individual satellite. A pseudo-random noise code is normally a repeating code which has random noise-like properties. In particular, the autocorrelation of a pseudo-random noise code approaches zero at all times except at zero delay.

In practice, the GPS system utilizes Gold codes, a form of pseudo-random coding, to phase modulate the carrier and spread the spectrum of the modulated information to combat interference and perform a variety of GPS-related functions. In the GPS system each satellite transmits several Gold encoded signals. While commercial users of the GPS system generally use what are known as C/A codes, the GPS satellites also transmit a P code encoded carrier which is intended primarily for military use. The C/A Gold codes for each satellite are published, whereas the P codes which are also Gold code modulated, are restricted due to their military nature.

The C/A code is encoded on a carrier $F_0/10 = 1.023$ MHz.

As mentioned above, each satellite utilizes a different Gold code as the spread spectrum C/A code. The spread spectrum carrier is modulated with an information signal containing data transmitted at 50 hertz. The differential phase shift keyed (DPSK) data is added to the spread spectrum carrier.

Accessing a GPS data stream requires a reversal of the above mentioned encoding process. Several types of information are thus derivable by decoding the spread spectrum positional signals developed by each GPS satellite. Such GPS receivers are of course known. Such receivers conventionally utilize a code tracking loop to de-spread the spread spectrum Gold code to recover the information contained within the code. The code tracking loop further phase locks an internally generated pseudo-random noise code to the incoming code to both remove the code and to establish the propagation delay between the satellite and receiver. This propagation delay defines the pseudo-range between the satellite and receiver. This propagation delay is not determinative of actual distance or range because the repeat time of the C/A code is substantially less than the distance being measured. The C/A code repeats itself approximately once per millisecond. The transmitted signal will only propagate about 293 meters during this time and thus, the pseudo-range is the range plus or minus a multiple of 293 meters.

Once the code tracking loop is locked, the pseudo-random noise code ca be removed from the satellite signal simply by mixing it with the local oscillator. The de-spread signal then passes to the carrier track loop which demodulates the satellite message by aligning the phase of the channel's local oscillator frequency with the phase of the intermediate or beat frequency. This action is commonly achieved by controlling the frequency of the voltage controlled oscillator. If the phase of the oscillation signal is not correct, a correction signal is applied to the oscillator. The carrier beat phase determines doppler shift between the satellite and receiver indicative of the relative velocity therebetween.

As mentioned above, a GPS receiver derives the pseudo-range from the received phase of the C/A code. More range precision is derivable from the carrier phase and range rate is derivable from the carrier frequency.

The track of each GPS satellite is well known and is published. Further, the information signal transmitted by the satellite describes its exact orbital location. From such orbital location information and the pseudo-range of several satellites, the position of an object on the earth's surface may be unambiguously determined. Three satellites must normally be monitored to obtain two-dimensional position with three-dimensional position being derivable from monitoring of a four satellite set.

Because multiple satellites are necessary to unambiguously determine position in a GPS system, a GPS receiver must monitor more than one satellite signal. In the past, various combinations of multiple channel continuous tracking receivers and switching receivers using one or more hardware channels switched between satellites have been utilized. However, it is generally considered necessary to monitor at least four satellites.

Prior GPS receivers have conventionally used analog processing to determine time of arrival for determining pseudo-range, carrier doppler frequency shift, and to resolve the 50 bit per second DPSK information signal. Only after this information was obtained was it conventionally digitized for computer processing of the information. Recently, there have been systems which have attempted to use digital signal processing techniques in at least part of the information acquisition process in a GPS receiver. However, the digital attempts have uniformly attempted to perform digital processing at a relatively high intermediate frequency requiring custom digital signal processing circuitry operating at sampling frequencies sufficiently high to resolve these relatively high intermediate frequencies. Accordingly, such digital signal processing implementations were uniformly expensive, requiring customized circuitry operating at high frequencies.

The Soviet Union has also implemented a spread spectrum navigation satellite system. The Soviet Union utilizes similar frequencies and data encoding technology to the American GPS system. The Soviet Union GLONASS system utilizes a single 511 bit direct sequence spread spectrum code for all satellites in the system. Each satellite, however, utilizes a unique carrier frequency which identifies the satellite. The GLONASS processing methodology is similar to that necessary for GPS. The RF signal is filtered and down converted and correlated with the matching spread spectrum sequence to collapse the information bandwidth. Because of the similarity of spread spectrum coding and transmitted frequencies, the decoding of GLONASS satellite transmitted signals may be performed in a manner substantially similar to that of GPS satellite signals.

As mentioned above, both existent analog and digital receiving and decoding solutions require relatively complex and expensive hardware operable at relatively high frequencies. There is a need to implement this technology with less expensive solutions to make global positioning receivers more widely available in the commercial market.

OBJECTS OF THE INVENTION

It is therefore an object of the present invention to produce a relatively inexpensive spread spectrum positional signal decoder. It is another object to produce a spread spectrum positional decoder which can inexpensively use digital signal processing technology.

It is an object of the present invention to produce a spread spectrum positional signal decoder which can utilize commercially available digital signal processing integrated circuits to produce a receiver/decoder of lower cost.

It is another object of the present invention to shift the carrier frequency of spread spectrum positional signals substantially to baseband to enable the processing of the baseband shifted spread spectrum positional signal using digital signal processing (DSP) technology.

It is still another object to baseband shift the spread spectrum positional signal while producing in-phase and quadrature-phase components to retain the informational content of the baseband shifted spread spectrum positional signal.

It is still another object of the present invention to maximize the information obtained from the spread spectrum positional signal for use in determining the position of the receiver.

SUMMARY OF THE INVENTION

These and other objects of the present invention are accomplished with the present invention's system and method for frequency shifting spread spectrum positional signals to shift their carrier frequency substantially to baseband and deriving information from such frequency shifted spread spectrum positional signals using digital signal processing techniques. The entire informational content of the spread spectrum positional signal is retained by mixing this signal with both the carrier frequency and a quadrature shifted carrier frequency to produce in-phase and quadrature-phase components of the baseband shifted spread spectrum positional signal, thereby retaining the entirety of the signal's informational content.

The method and system of the present invention further contemplate analog to digital converting the in-phase and quadrature-phase spread spectrum positional signals and correlating these components with a matched spread spectrum sequence to collapse their informational bandwidth and facilitate recognition of the spread spectrum code. Correlation recognition is performed by first performing a complex multiplication of the signal with itself to square the signal and thereby remove the phase shift keyed information therefrom and subsequently performing a Fast Fourier transform on the correlation product to determine the degree of correlation. Once the degree of correlation exceeds a threshold, the multibit sample of the selected spread spectrum code is more finely shifted with respect to the incoming signal to enhance the degree of correlation and thus enhance the accuracy of the determination of time delay between the satellite transmitter and receiver. The frequency estimate obtained rom the fast Fourier transform is used to seed a Costas Loop oscillator with an initial complex oscillation frequency. As the Costas oscillator locks onto the carrier frequency, the oscillator produces a more accurate estimate of carrier frequency and additionally decodes the data contained within the de-spread information signal. Thus, the data content is derived, as is an accurate determination of carrier frequency, which may be used to determine the doppler frequency shift between the transmitted carrier frequency and received carrier frequency. This doppler frequency shift is of course indicative of the range rate between the transmitter and receiver. Thus, in the present invention, all information may be derived digitally using digital signal processing circuitry at relatively low sampling rates.

BRIEF DESCRIPTION OF THE DRAWINGS

The present invention as described hereinabove may be better understood with reference to the detailed description set forth hereinbelow and the accompanying drawings in which:

FIG. 1 is a schematic illustration of a baseband shifting section of the receiver/demodulator according to the present invention.

FIG. 2 is a schematic illustrating one possible embodiment of an analog acquisition section of the GPS receiver/demodulator of the present invention.

DETAILED DESCRIPTION OF THE PREFERRED EMBODIMENTS

Figure 3:
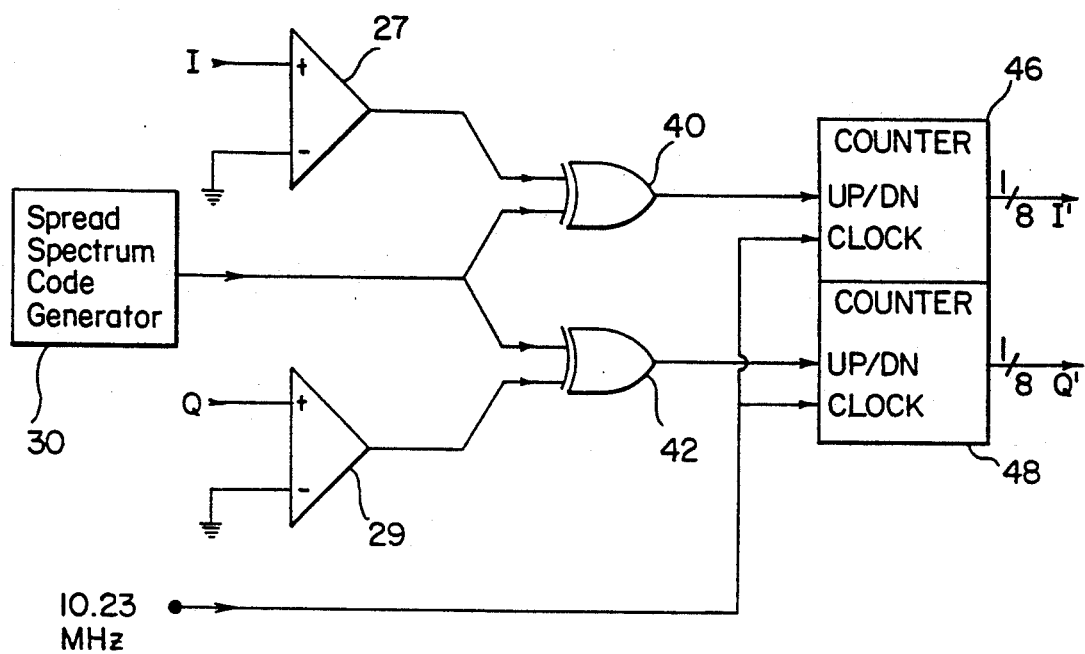
FIG. 3 is a schematic illustrating a preferred digital hardware implementation of the analog acquisition section of the GPS receive/demodulator of the present invention.

A preferred embodiment of the method and system of the present invention will now be described with reference to the above mentioned attached drawing figures. It should be understood that like reference numbers are used when the same element is represented in more than one figure. It should be noted that the receiver/demodulator of the present invention is designed to substantially entirely be implemented by a single digital signal processing integrated circuit. Due to the unique processing utilized in a device according to the teachings of the present invention, substantially all of the circuitry illustrated in FIGS. 4-6 would, in the preferred embodiment, be implemented with a single audio digital signal processor. Thus, a single audio digital signal processor may perform all of the complex and heretofore high costs intermediate frequency processing data extraction and data processing functions of a spread spectrum positional signal receiver/demodulator. It is also contemplated that at least some of the circuitry of FIG. 3 might also be implemented with this same digital signal processor. However, the benefits of the present invention need not require the use of such a digital signal processor.

There currently exists a large class of commercial audio digital signal processors which can be utilized in constructing a preferred embodiment of the present invention. According to the teachings of the present invention, such digital signal processors are capable of despreading, phase locking, decoding and reducing raw data into a navigational velocity, heading and position fix. The system and method of the present invention can be used with currently available low cost 16, 24 and 32 bit fixed or floating point processors. Such processors are currently capable of an access of ten million operations per second (MIPs) and include one or more high speed serial communications ports.

Any suitable digital signal processor can be selected according to the teachings of the present invention. However, the present invention contemplates use of a digital signal processor employing 16 or more bits of precision, having single cycle add, subtract, and multiplier arithmetic, internal data and program memory, a high speed (Mhz) double buffer 16 bit serial port, and no more than 100 nanosecond cycle time. The preferred embodiment of the present invention contemplates utilizing a Texas Instruments TMS-320C25 digital signal processing chip to process data in the manner to be described hereinbelow. The circuitry of the present invention has been designed to be compatible with the relatively low clocking frequencies utilized in such a digital signal processor.

In the TMS-320C25, a 40.92 MHz clock rate is divided by four to provide a 10.23 MHz clock rate which is accessible to the exterior of the chip. This clock rate is conveniently mathematically related to the 1.023 MHz frequency used in the GPS spread spectrum code. Thus, when the spread spectrum C/A signal received from the satellite is frequency shifted substantially to baseband, according to the teachings of the present invention, such a conventional audio digital signal processor may be conveniently used to perform all necessary processing functions.

Referring now to FIG. 1, the baseband shifting section of the GPS receiver of the present preferred embodiment is illustrated. The circuitry of this figure is analog in nature and is constructed external of the digital signal processor. In the preferred embodiment, a circular polarized antenna 2 receives the signals transmitted by one or more GPS satellites, which signals are bandpass filtered by a radio frequency bandpass filter 4 tuned to the frequencies of interest and producing the spread spectrum positional signals of interest at its output.

The radio frequency bandpass filter 4 is, in the preferred embodiment, a strip line filter having 3 db frequencies +/−25 MHz from the carrier frequency of 1575.42 MHz. A radio frequency amplifier 6 amplifies the spread spectrum positional signals of interest to a sufficient level to enable it to withstand subsequent processing above the noise floor. This amplified output of the radio frequency amplifier 6 normally contains one or more monitored spread spectrum information signals which, in the case of GPS, would be carrier frequency modulated by a binary phase shift-keyed BPSK pseudo-random Gold code with a 50 Hz information bearing BPSK signal superimposed thereon. The frequency band of the transmitted spread spectrum positional signal is centered about the carrier center frequency.

A C/A signal carrier frequency oscillator 10 develops a frequency equal to the transmitted spread spectrum signal carrier frequency. Thus, in the case of the C/A signal, the oscillator would generate a frequency of 1575.42 MHz. The C/A signal carrier frequency oscillator 10 could be any oscillator capable of generating the stable carrier frequency of the received spread spectrum signal. However, in the preferred embodiment, the oscillator 10 is a phase locked looped stabilized oscillator using the 10.3 MHz chip frequency of the digital signal processing chip to maintain stability and accuracy. The oscillation frequency is supplied to a 90° phase splitter 12 which generates an in-phase and quadrature-phase version of the oscillator frequency. The spread spectrum positional signals output from the output of the radio frequency amplifier 6 are then divided into two duplicate signals on duplicate signal paths by a 0° phase splitter 8. The in-phase oscillator frequency is then mixed with the received C/A signal by an in-phase mixer 14 to produce a baseband shifted spread spectrum C/A signal at the output thereof. Similarly, the quadrature oscillator frequency component is mixed with the C/A spread spectrum signal by a quadrature-phase mixer 16 to produce a quadrature baseband shifted spread spectrum C/A signal component at the output thereof.

While in the preferred embodiment, the 90° phase splitter produces the quadrature oscillation frequency output, the 0° phase splitter 8 and 90° phase splitter 12 could, in principle, be exchanged. In other words, the Received spread spectrum positional signals could be split into in-phase and quadrature-phase components while the 0° phase splitter 8 simply divided the output of the oscillator 10 into duplicate mixing frequencies. However, because such splitters typically encounter varying phase shift with respect to frequency, use of the 90° phase splitter 12 in the received signal path would require a phase shift network to compensate for frequency variations in the received signal produced by, for example, doppler frequency shift.

The in-phase spread spectrum C/A signal 5 I produced at the output of in-phase mixer 14 and the quadrature-phase baseband shifted spread spectrum C/A signal Q developed by quadrature-phase mixer 16 are then passed through DC filtering or decoupling capacitors 22,24 and supplied to in-phase and quadrature-phase baseband amplifiers 18,20. These in-phase and quadrature-phase baseband amplifiers 18,20 function to amplify the baseband shifted spread spectrum signals and additionally, are intentionally selected to perform a low pass filtering function.

The baseband shifted in-phase and quadrature-phase spread spectrum C/A signals I,Q will have substantially all of their energy in a 0–500 KHz bandwidth. The preferred embodiment uses inexpensive operational amplifiers which are selected with roll off characteristics which provide low pass filtering with a 3 db frequency of approximately 500 KHz. This avoids the need for independent filtering and facilitates efficient creation of in-phase and quadrature-phase baseband shifted spread spectrum C/A signals I,Q which have now been filtered and amplified. Through proper selection of the in-phase and quadrature phase bandpass amplifiers 18,20 to have the 0.5 MHz 3 db bandwidth, the system is provided with the equivalent of a 1 MHz bandwidth filter at radio frequencies with a shape that closely matches the sine (X)/X spectral density function of the spread spectrum signal.

FIG. 2 is a simplified schematic diagram of the analog acquisition section of the spread spectrum signal receiver/demodulator according to the teachings of the present invention. The in-phase and quadrature-phase baseband C/A signals I, Q are supplied to first and second analog/digital converters 26,28 which are in effect comparators or hard limiting amplifiers which slice the I and Q baseband C/A signals at a 0 volt threshold. Thus, a one bit, wide band binary C/A signal output is developed in phase at the output of analog/digital converter 26 and quadrature phase at the output of analog/digital converter 28. These signals are respectively supplied to an in-phase correlation multiplier 32 and quadrature phase correlation multiplier 34 where they are multiplied with a multibit sample of a selected spread spectrum code produced by a spread spectrum code generator 30 to be described in greater detail with reference to FIG. 4. The one bit correlation outputs of the in-phase correlation multiplier 32 and quadrature-phase correlation multiplier 34 are lowpass filtered by first and second correlation lowpass filters 36,38 to produce in-phase and quadrature-phase digital correlation products I',Q',respectively. These digital correlation products I', Q' are then used for carrier detection and tracking as will be later described with reference to FIGS. 5-7.

While FIG. 2 illustrates a simplified version of the analog acquisition section, FIG. 3 of the present application illustrates a preferred embodiment which is better adapted to available hardware and uses low cost digital elements. In this embodiment, the analog-to-digital conversion is once again performed by a pair of analog/digital converters in the manner described with respect to FIG. 2. However each of the analog/digital converters 26,28 of FIG. 2 is formed in this figure by the combination of a respective phase comparator 27,29 in cooperation with a respective up/down counter 46,48. The in-phase and quadrature-phase base-band C/A signals I,Q are provided from the base-band shifting section of FIG. 1. The respective phase comparators 27,29 compare the respective in-phase and quadrature-phase baseband signals I,Q with ground level to form a binary square wave representation thereof. The embodiment of FIG. 3 utilizes in-phase and quadrature phase exclusive OR gates 40,42 which function as one bit correlation multipliers to compare the binary in-phase and quadrature-phase base-band shifted spread spectrum signals output from the respective phase comparators 27,29 with a multibit sample of a selected spread spectrum code supplied by a spread spectrum code converter 30. The correlation output of these in-phase and quadrature phase exclusive OR gates 40,42 is then supplied to in-phase and quadrature phase up/down counters 46,48 which performs low pass filtering (integration) of the correlated output. The output of the exclusive OR gates 40,42 which function as correlation multipliers, are supplied to the up/down control pin of their respective up/down counters 46,48 while the 10.23 MHz clock frequency is used as the clock input.

The in-phase and quadrature-phase comparators 27,29 in combination with their associated up/down counters 46,48 form a high dynamic range analog-to-digital converter which also performs the necessary lowpass filtering. The comparator provides one bit (6 db) dynamic range over a 5 MHz bandwidth. By performing a lowpass filtering function, the signal-to-noise ratio is further raised over 10 db at the outputs I', Q' of the up/down counters 46,48.

The correlation multiplication performed by the in-phase and quadrature phase exclusive OR gates 40,42 reduces the bandwidth which must be analyzed, when correlation exists, from 1.023 MHz to 32 KHz. When the multibit spread spectrum code generated by the spread spectrum code generator 30 correlates with the baseband shifted spread spectrum C/A signal, the output of the exclusive OR gates 40,42 will collapse the transmitted despread information signal to a 0 +/−5 KHz bandwidth. In the preferred embodiment, the up/down counters are output sampled at a frequency of 32,000 Hz. Thus, the up/down counter which performs sum and dump integration reduces the bandwidth of the receiver channel to 16 KHz. The relatively high +/−16 KHz system bandwidth is substantially higher than the +/−5 KHz bandwidth of the collapsed spread spectrum signal. This increased bandwidth allows the system to operate with high doppler rates, allowing tracking of the collapsed spread spectrum signal despite high relative velocities between the satellite and the receiver of the present invention. Also, the 32 KHz sample rate at the output of the up/down counters produces 32 complex signal samples in a one millisecond analysis window. This is advantageous as the samples can then be used in a 32 complex point fast Fourier transform in the carrier detection section to be later described with reference to FIG. 5.

Figure 4:
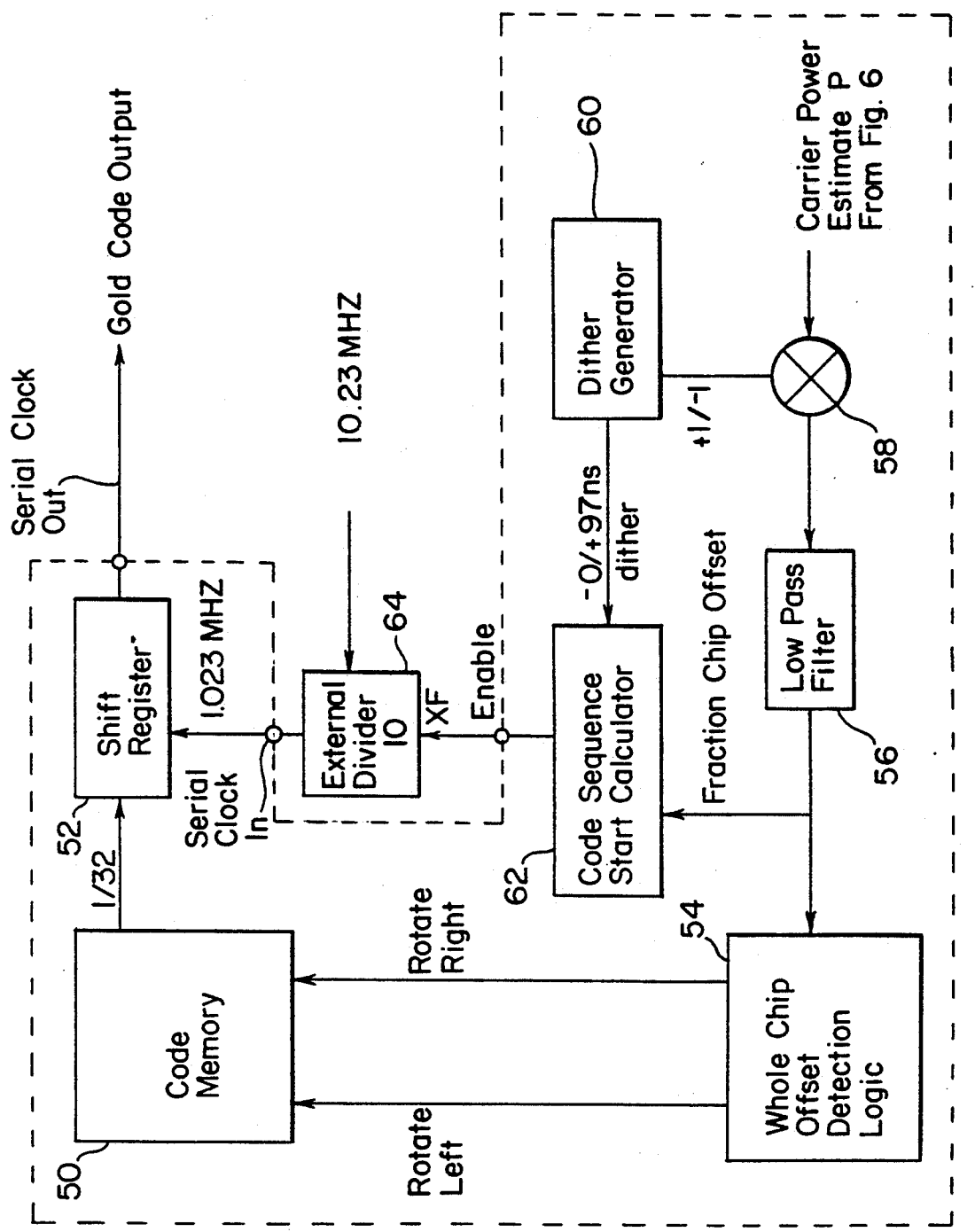
FIG. 4 is a schematic representation of one embodiment of a code generation section of the GPS receiver/demodulator of the present invention.

FIG. 4 illustrates the code tracking section of the GPS receiver/demodulator of the present preferred embodiment. It should be understood that, due to the digital signal processing implementation of the present invention, the boxes of FIG. 4 will illustrate both hardware and software elements of the preferred embodiment. The preferred embodiment utilizes a software managed spread spectrum code generator. The digital signal processing (DSP) CPU, schematically illustrated as 1 in this figure, to emulate a direct sequence spread spectrum code generator which would be hardwired as is commonly done in the art. The code chips (individual bits of the code) that make up each code frame are stored in a code memory portion 50 of the digital signal processors' memory.

As has already been mentioned, each satellite in the constellation of global positioning satellites utilizes a unique spread spectrum code. The codes identifying each of these satellites will be stored in the code memory 50. A selected multibit code sequence is read out of memory one word at a time and into a high speed serial shift register 52 of the digital signal processor 1. As will be explained later, code correlation is performed on a one millisecond multibit sequence of a selected code stored in memory. Correlation can be detected if the received spread spectrum code and the spread spectrum code generated from code memory 50 correlate within one-half chip of offset. For this reason the multibit code sequence is slipped across the signal being received in one-half chip increments. In other words, each time correlation is determined, as will be later described, the multibit code sample generated by the code generation section will be varied (normally advanced) one-half chip. Accordingly, the code correlation procedure requires the code tracking section to control the starting point of the one millisecond code sequence in one-half chip steps.

In the preferred embodiment, the digital signal processing CPU's internal timer enables a programmable external divider 64 to vary its division ratio under program control. Integer chip delays, however, are performed by rotating the code within the code memory left or right under control of a whole chip offset detection logic program 54. When the code sequence needs to be shifted one shift (bit) to the left or right, the shift is performed in software by rotating the bit pattern in memory. The whole chip offset detection logic program determines when an integer increment of the multibit code sequence is necessary on the basis of the accumulated chip shift. Fractional offsets are produced by delaying the start time of the one millisecond sequence under control of the external enable signal XF provided off chip to the external divider 64. The one millisecond start time calculation is controlled in one-tenth chip increments by the multibit code sequence start calculator 62 so as to allow maximum correlation to occur. In practice, prior to detection of correlation between the multibit generated spread spectrum code and the received spread spectrum code, the multibit selected spread spectrum code is shifted one-half chip each one millisecond sample in the case of monitoring a single channel, so that initial correlation detection can be made. This is performed by advancing the output of the code memory for alternate samples while dithering the start time of the multibit code sequence + or − one quarter chip under control of a dither generator 60 to thereby advance the code in one-half chip increments. Initial correlation detection may be made when correlation error is no greater than one-half chip.

In the fast sequencing system of the present invention, the tracked satellite's code must be loaded into a shift register 52 from the code memory 50 during each one millisecond cycle, as successive periods monitor different satellites. The shift register 52 is double buffered (two words long). One word is being shifted out and the other word shifted in so that the shift register provides the necessary multibit selected spread spectrum code sample during each one millisecond dwell period.

Once initial correlation is detected, the multibit code sequence start calculator 62 controls the one millisecond start time calculation to determine the start time for each one millisecond sample in one-tenth chip increments until maximum correlation is determined from the carrier power estimate received from the carrier tracking loop as will be later explained with respect to FIG. 4.

In a single channel processor, successive one millisecond Gold code outputs produced by the shift register 52 will vary by one-half chip. However, in the case where the receiver/demodulator is designed as a multiplexing system as is the case in the present invention, successive one millisecond samples will normally be of differing code sections. In the preferred embodiment, five channel multiplexing is used, such that a single Gold code is correlated with the monitored signals one millisecond for each five millisecond interval.

The code tracking section of FIG. 4 utilizes the tau dither method to produce one-tenth chip adjustments of the multibit selected spread spectrum code to enhance the degree of code correlation. The multibit code sequence start calculator 62 advances or delays the correlation chip timing one-tenth of a chip to seek an increased carrier power or energy from the carrier tracking section as described in FIG. 7. Successive measurements are differed to derive an estimate of the partial differential $\partial E/\partial t$. This information is filtered and used to drive a gradient search to track the peak in the cross correlating sum. Thus, the processor may more quickly track correlation accurate to one-tenth of a chip, thereby yielding +/−50 nanosecond pseudo range time estimates. Alternatively, low noise sequential solutions may utilize as many as three serial code correlators, one early, one prompt, and one late, the difference on the earlier and late signals being used to drive the code block loop and the prompt signal driving the data processor to provide accurate one-tenth chip code correlation.

The advantage of the code tracking techniques utilized according to the teachings of the present invention is that they make use of the shift register hardware existent in standard digital signal processing chips. When a digital signal processor utilizing two or more high speed serial ports is utilized, such a processor may be designed to monitor two or more satellites simultaneously through their ability to generate independent data correlation sets.

Figure 5:
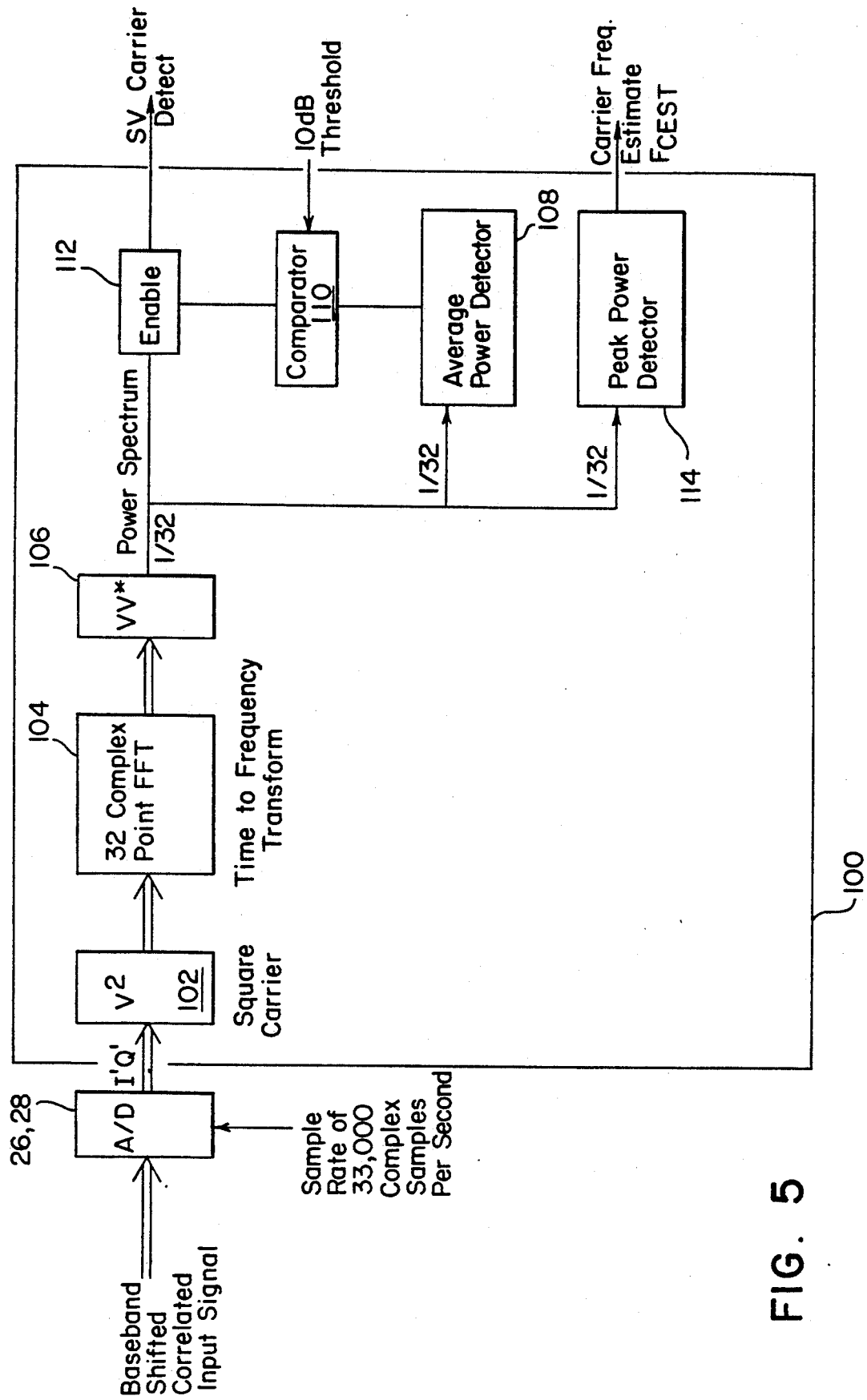
FIG. 5 is a schematic representation of an embodiment of the carrier detection section of the GPS receiver/demodulator of the present invention.
Figure 6:
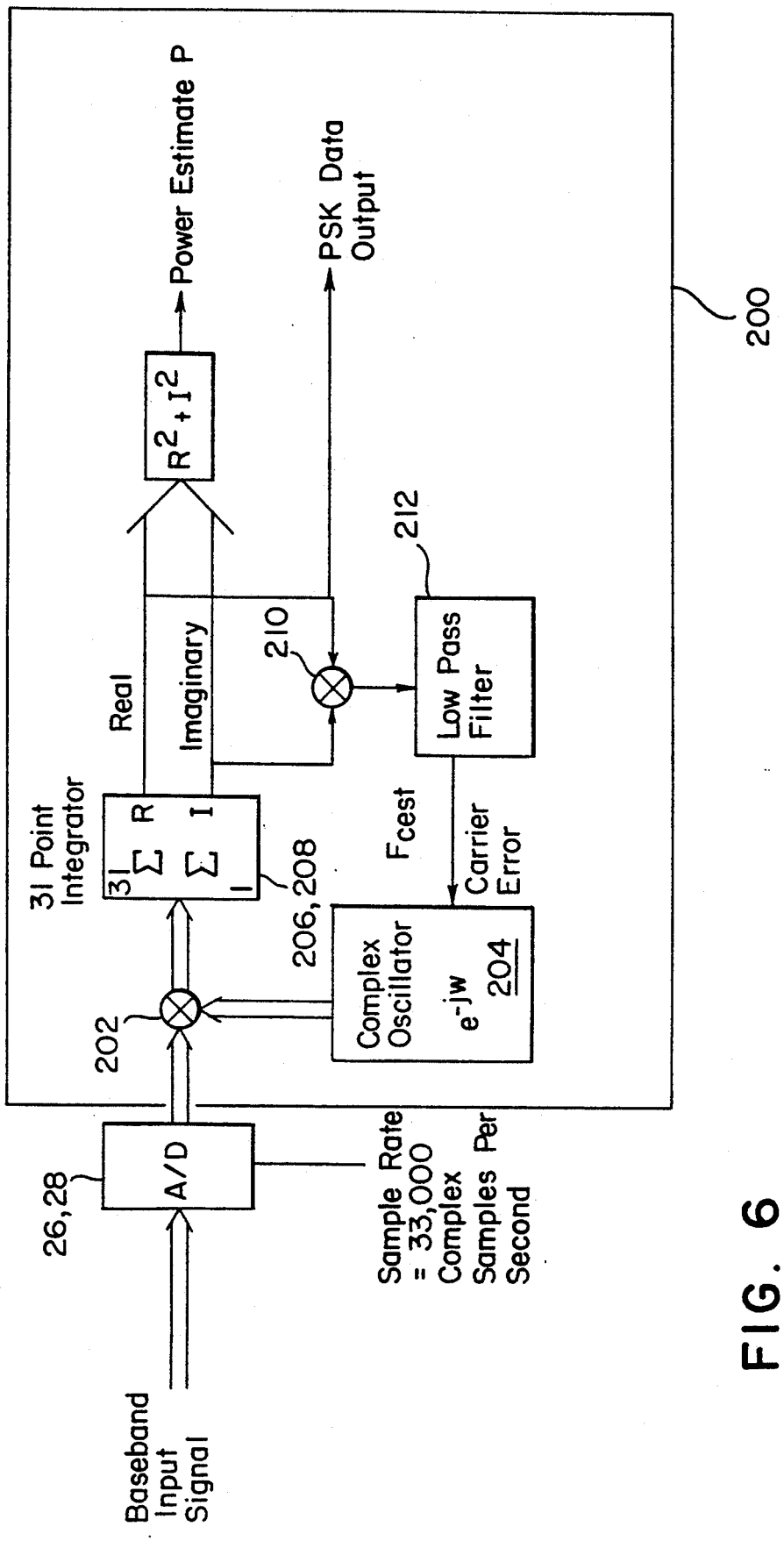
FIG. 6 is a schematic representation of the carrier tracking section of the GPS receiver/demodulator of the present invention illustrated in FIG. 6.

FIG. 5 schematically illustrates a digital signal processing embodiment of the carrier detection section utilized in accordance with the teachings of the present invention. This carrier detection section has two primary functions, firstly to recognize when correlation exists between a respective one of the baseband shifted in-phase or quadrature-phase spread spectrum signals with the selected multibit spread spectrum code. A second function is, once correlation is detected, to estimate carrier frequency of the received carrier wave which is then used to seed(initialize) the Costas oscillator in the carrier tracking section as will be later described.

In FIG. 5, the in-phase and quadrature-phase analog/digital converters 26, 28 of FIG. 2 are schematically illustrated as a single A/D converter. It should be understood that a single converter could be multiplexed for this purpose or two separate converters could be used. The analog/digital converter receives a base band shifted information signal which is the correlation of the baseband shifted spread spectrum information signal I,Q and the selected multibit spread spectrum sample developed by the code generation section of FIG. 4. In the correlation products I',Q', when correlation occurs, the power spectrum at the carrier frequency will be substantially above the noise threshold. Because of the nature of the spread spectrum codes, when correlation does not occur, measurable power will not occur at the carrier frequency.

The I' and Q' signals produced as complex samples at the output of the A/D converters 26, 28 may include a doppler frequency shift related to the relative velocity between transmitter and receiver which, in the preferred embodiment, is assumed to be within 8 K cycles of the transmitter carrier frequency. Additionally, the I' Q' signal is modulated by the 50 Hz DPSK data signal carried thereon. In order to remove the data sidebands and produce a signal having only the carrier frequency and doppler shift, the correlation products I',Q' are squared by a carrier squarer 102 to remove the 50 Hz data phase modulation from the underlying carrier which bears the doppler frequency term. While in the preferred embodiment, the data is removed by squaring the input signal after complex multiplication, the input signal could also be squared before a complex multiplication. The resultant signal output from the carrier squarer 102 is then provided to a 32 complex point fast Fourier transform 104 which performs a transform of the squared carrier.

In the preferred embodiment, the A/D converter 26, 28 would normally monitor the baseband shifted correlated input signal at a rate of approximately 33,000 complex samples per second. This provides a $+/-16.5$ KHZ band width for doppler frequency shift which should be the only component of the squared correlation product produced at the output of the carrier squarer when correlation occurs. The fast Fourier transform 104 examines one millisecond segments of this signal which each comprise 31 samples. The 31 squared data points output from the carrier squarer 102 are input to the Fourier transform 104, in the preferred embodiment a 32 complex point fast Fourier transform. Zero padding fills up the 32nd input complex term with zeros, this Fourier transform therefore arranges the real and imaginary components of the energy of the transform signal into frequency bins having a frequency equal to 31,000/32.968.75 Hz or slightly under 1 Khz.

When the spread spectrum sequence is correlated, the underlying carrier energy will be coherently summed into several adjacent fast Fourier transform frequency bins. The power at each frequency is VV*. The peak power will be higher than the average power by more than some threshold, for example, 6 Db.

The average power, the average of the 32 bins of the fast Fourier transform 104, is determined by an average power detector 108. A threshold comparator 110 compares this average power with a threshold representative of the noise floor. When the average power exceeds this threshold as determined by the threshold comparator 110, the output of the comparator signals that the carrier has been detected. This carrier detection signal is further used to control the stepping of the multibit spread spectrum code sample across the baseband shifted spread spectrum information signal to search for a correlation therebetween. Accordingly, by stepping the generated multibit spread spectrum code one-half chip at a time across the incoming signal, the system overcomes time uncertainty in the correlation process. The frequency uncertainty is compensated for by the frequency bins of the fast Fourier transform and is detected by, upon detecting maximum average power, determining the frequency bin at which peak power occurs using a peak power detector 114. Peak power detector 114 generates a carrier frequency estimate representative of the center frequency of the frequency bin in which maximum power of the correlated signal is detected. This is used by the carrier tracking section described in FIGS. 6 as a seed frequency for use in the Costas oscillator as will be later described. Because of the FFT input data squaring which doubles the frequency of the squared signal, the fast Fourier transform resolution per bin is 484.375 Hz. This is sufficient to seed the Costas oscillator.

It is possible that the 1 Khz noise band width within the Fourier transform is insufficient to avoid a random noise sampling appearing as a signal carrier. The present invention contemplates avoiding false detection by repeatedly sampling the correlation output to establish that N of M successful detections exist. N and M can be determined by noise margins but might be, for example, 4 and 5 respectively.

Once the spread spectrum code is identified and removed by correlation with a generated multibit code sample, and the carrier frequency has therefore been detected, the carrier frequency must be accurately tracked so as to more accurately determine the range between transmitter and receiver, and more accurately ascertain the frequency of the carrier to determine the range rate or doppler shift between transmitter and receiver. In the preferred embodiment, carrier tracking is performed by a Costas complex phase lock loop. The baseband shifted despread information signals I',Q' are supplied to a complex multiplier 202 where they are multiplied by a local complex oscillator 204 to remove the carrier from the despread information signal. The I' and Q' despread baseband shifted signals comprise a carrier wave modulated by the DPSK data. The complex multiplier 202 shifts these signals to baseband to resolve the data contained therein. The imaginary output of the complex multiplier is utilized to correct phase error and to encourage phase lock tracking of the complex oscillator 204 to the despread in-phase and quadrature-phase signals. The doppler frequency offset term is removed by complex multiplying the input samples by its complex conjugate $e^{-j\omega t}$. The resulting vector terms can be integrated over the 20 millisecond period of a single data bit. This reduces signal noise band width and the Costas carrier phase lock loop error. Ambiguity in the imaginary term is removed by multiplying the imaginary term by the $+/-1$ modulation data term with a data demodulator or multiplier 210.

In the preferred embodiment, the Costas oscillator is constructed in software by the phase accumulator method. In this method, a difference value is added to an accumulator. The accumulator increases by this phase value. The most significant bits of the accumulator are used in cosine and sine lookup tables to translate phase angle to a complex sinusoid value (cosine+j*sin).

The complex phase locked oscillator 204 of the Costas loop is initially seeded with the frequency estimate obtained from the peak power detector 114 of the carrier detection section of FIG. 5. Once the frequency is seeded, the Costas loop will track, in the manner of any phase lock loop, to the exact frequency of the carrier. Thus, an accurate carrier frequency may be ascertained and utilized for doppler determination and the phase of the carrier is also accurately known to more accurately determine the slant range between transmitter and receiver. The receiver/demodulator therefor determines:
1) the spread spectrum code used by the
2) the timing offset between the spread spectrum code and the carrier phase which is usable to determine accurate pseudo range;
3) the carrier doppler frequency which establishes range rate; and
4) the data transmitted by the GPS satellite.

Of course, readings from more than one satellite are necessary in order to determine user position. Three satellites must generally be monitored to obtain two-dimensional position accurately while four satellites are normally needed for three-dimensional positioning. In addition to tracking an established constellation of satellites, as satellites rise and fall with respect to the horizon, additional satellites must be acquired. Accordingly, the preferred embodiment contemplates fast sequencing across a constellation of five satellites, using four to determine present position and using a fifth multiplex channel to search for and acquire additional satellites. Such a time multiplex fast sequencing system can be implemented with a single audio digital signal processor through time division multiplexing. I the present invention, one millisecond out of five is devoted to tracking of a single satellite. Thus, every five milliseconds, a single satellite is monitored once with each satellite being monitored every five milliseconds. This is sufficient to monitor the content of the data signal and update all monitored parameters. Through the use of a one millisecond scan rate with five satellites, each satellite has a revisit rate of 200 samples per second. This is sufficient both to maintain carrier lock in a highly dynamic observer vehicle and assure continuous demodulation of the 50 broad DPSK satellite data stream.

The system of the teachings of the present invention may also be used to receive and decode spread spectrum positional signals of other types, for example, those generated by the Soviet Union's GLONASS system. The Soviet Union's GLONASS satellite system uses a unique carrier frequency for each sv but uses only a single 5-11 bit direct sequence spread spectrum code. The GLONASS processing methodology may be very similar to that of the GPS solution. The GLONASS code has 5-11 bits while the GPS code 10-23 bits. However, the GLONASS code may be sampled at the higher GPS data rate. While a maximum one quarter and average one-eighth chip misalignment will occur, this results in only a −0.58 Db degradation in the GLONASS signal to noise acquisition.

Summary of Operation

In operation, the receiver/demodulator of the present invention functions as follows:

The signal spectrum of the relevant frequency band is received by the circular polarized antenna 2, is band limited to the frequencies of interest by radio frequency bandpass filter 4 and split into first and second spread spectrum positional signal components by the zero degree phase splitter 8. In a GPS embodiment, the signals of interest are all encoded on a 1575.42 Mhz carrier. According to the teachings of the present invention, the incoming spread spectrum positional signals are frequency shifted substantially to base band by multiplication with an oscillator frequency produced by the C/A signal carrier frequency oscillator oscillating at 1575.42 Mhz. This oscillator frequency is mixed with the incoming signals by mixers 14,16 to produce in-phase and quadrature-phase spread spectrum positional signals I,Q. These signals are substantially at baseband. However, the informational content of the entirety of the spectrum of interest is retained through the use of separate in-phase and quadrature components. Thus, the entirety of the single band width can be recovered.

Shifting of the signal substantially to baseband has several advantages including, in particular, the ability to use a digital signal processor processing at relatively low frequencies. It is important to retain the in-phase and quadrature-phase component of the spread spectrum positional signal whenever the band width of the spread spectrum positional signals folds about base band. Full benefits of the present invention are realized when the spread spectrum positional signals are shifted substantially to baseband, the doppler frequency term being excepted. An additional benefit of shifting the in-phase and quadrature-phase spread spectrum positional signal substantially to baseband is that inexpensive operational amplifiers may be utilized as low pass filters to remove all undesirable portions of the signal spectrum. No complex filtering is therefore required as the frequencies of interest are between baseband and the rolloff frequency of the in-phase and quadrature-phase baseband operational amplifiers 18, 20.

The in-phase and quadrature-phase spread spectrum positional signals are then correlated with a spread spectrum code generated within a digital signal processor. The spread spectrum code generator 30 generates a multibit sample of a selected spread spectrum code which is then correlated with the incoming in-phase and quadrature-phase spread spectrum positional signals. The correlation process must be iteratively performed while slipping the multibit code sample across the incoming in-phase and quadrature-phase spread spectrum positional signals to establish whether a match exists. Each possible code is generated and compared to the spread spectrum positional signals until a match is determined in the fast Fourier transform 104. The in-phase and quadrature-phase comparators 26A, 28A and up/-down counters 46, 48 collectively form an analog-to-digital converter and further control the sampling of the digital data at the desired data rate.

The degree of correlation between the multibit spread spectrum code sample and the in-phase and quadrature-phase spread spectrum positional signals is determined by a carrier tracking section as illustrated in FIG. 5. The correlation product between the multibit code sample and the spread spectrum positional code components is first squared by carrier square 102 to remove the differential phase shift keyed data from the correlation product. One correlation exists, the correlation product will be the carrier frequency plus any doppler term. Since the absence of a doppler term causes the carrier frequency to be zero frequency, the frequency of a correlated correlation product will equal the doppler shift frequency.

One property of the spread spectrum positional codes utilized is that they exhibit pseudo-random noise properties. This means that when the code is correlated with itself, the correlation is substantially zero unless the phases of the signals are coincident. Accordingly, the power of the correlation product when the signals are uncorrelated is substantially entirely due to noise components. On the other hand, a strong power peak at the carrier frequency will exist when the signals are correlated. Accordingly, the system of the present invention utilizes a 32 point complex fast Fourier transform 104 to convert the correlation product to the frequency domain and the power spectrum of each frequency bin is monitored. When the average power spectrum exceeds a threshold, the carrier is detected. Substantially all of the power of the correlated signal will exist in a single frequency bin. This is detected by the peak power detector 114 which produces a carrier frequency estimate based upon the frequency of the frequency bin. This carrier frequency estimate is a doppler frequency estimate which estimates the range rate between the transmitter and receiver.

The multibit code segment generated by the code tracking section is shifted one-half chip each one millisecond examination period. Once the carrier is detected, the tau dither method is used to lock onto the peak power frequency. The code tracking system will delay the one millisecond start time at step 62 in one tenth chip increments to optimize the correlation match. This is performed by the known tau dither method.

The carrier tracking section utilizes a Costas loop for complex phase locking to the carrier signal. Once code lock is accomplished by the carrier detection section, the output of the A/D converters 26, 28, the correlation product, is the carrier frequency modulated 50 bD DPSK data signal. The complex oscillator is seeded by setting the frequency term ω to the carrier frequency estimated by the peak power detector 114 of the carrier detection section of FIG. 5. Thereafter, the imaginary error is utilized to vary the complex oscillator frequency to phase lock onto the carrier frequency. The output is therefore easily resolved as the phase shift keyed data signal.

From the above explanation it should therefore be apparent that the system of the present invention can detect accurate pseudo-range through code and carrier phase detection, can determine range rate from the carrier doppler frequency, can identify the satellite of interest through its unique spread spectrum code, and can obtain the underlying satellite transmitted data. All functions can be performed with the system of the present invention which can be substantially completely implemented by a single 10 MIPs digital signal processor originally intended for audio use which may be economically obtained. Because multiple satellites must be tracked, the system of the present invention fast sequences through a constellation of five satellites examining each satellite for each millisecond. Because all processing is performed at baseband and is performed digitally in a single digital signal processor, the signal processing may be easily switched from satellite to satellite in one millisecond intervals so that five satellites are monitored every five milliseconds.

It will be readily apparent to one of ordinary skill in the art that the present invention may be utilized to decode GLONASS spread spectrum signals or other forms of spread spectrum positional signals. It should be understood that the system of the present invention may be easily used with known data utilization techniques to produce a complete spread spectrum positional signal location determination system such as a complete GPS position locator.

It should of course be clearly understood that the present invention may be modified in any manner apparent to one of ordinary skill in the art. The scope of applicant's invention should not be limited by the specification, and should be limited solely by the scope of the appended claims.

I claim:

1. A method of deriving information from spread spectrum positional signals modulated on a carrier frequency comprising:
   a) frequency shifting said spread spectrum positional signals to shift said carrier frequency substantially to baseband; and
   b) deriving said information from frequency shifted spread spectrum positional signals using said standard audio digital signal processing techniques.

2. The method of claim 1 wherein said method is performed within a standard audio digital signal processor.

3. The method of claim 1 wherein said step b) of deriving includes collapsing the bandwidth of said spread spectrum positional signals by removing a spread spectrum code contained therein.

4. The method of claim 3 wherein said spread spectrum code is a pseudo random noise code.

5. The method of claim 4 wherein said pseudo-random noise code is a Gold code.

6. The method of claim 3 wherein said step a) of frequency shifting comprises:
   i) developing a mixing frequency equal to said carrier frequency;
   ii) phase quadrature shifting said mixing frequency to form a phase shifted mixing frequency;
   iii) multiplying said spread spectrum positional signals with both said mixing frequency and said phase shifted mixing frequency to form baseband shifted spread spectrum signal in-phase and quadrature components.

7. The method of claim 2 wherein only digital techniques are used in said step b) of deriving.

8. The method of claim 6 further comprising analog to digital converting said spread spectrum signal in-phase and quadrature components to form binary in-phase and quadrature spread spectrum signal components.

9. The method of claim 8 wherein said step b) of deriving comprises:
   correlating said in-phase and quadrature components with a matched spread spectrum sequence and collapsing their information bandwidth to develop an in-phase and quadrature portions of the despread information modulated frequency shifted carrier.

10. The method of claim 9 further comprising c) selecting a spread spectrum code and generating a multibit sample which might match the spread spectrum code contained in said spread spectrum positional signals;
    said step b) of deriving including,
    i) correlating the multibit sample selected by said step c) with both said in-phase and quadrature components and determining the presence of a match therebetween, and
    ii) determining, upon detecting the presence of a match in said step of correlating, 1) that said selected spread spectrum code is the spread spectrum code of said positional signals, and 2) an estimate of the frequency of the doppler shifted carrier.

11. The method of claim 10 wherein said step c) of selecting repeatedly updates said multibit sample to develop time advanced samples of said selected spread spectrum code,
    said multibit samples being correlated by said step i) of correlating until a match is determined.

12. The method of claim 11 wherein said step i) of correlating includes the steps of,
    multiplying said multibit sample with said in-phase and quadrature components to produce a correlation product, and
    performing a fast Fourier transform on said correlation product to determine the degree of correlation therebetween at varying frequencies, the frequency at which maximum correlation occurs representing the frequency doppler shift caused by relative velocity between a transmitter and the receiver of said spread spectrum positional signals,
    said step of performing a fast Fourier transform thereby determining, upon detecting the presence of a match, 3) a doppler shift frequency estimate, said step ii) of determining thereby developing an approximate estimate of the relative velocity between the transmitter and receiver of said spread spectrum positional signal from said doppler shift frequency.

13. The method of claim 12 wherein said spread spectrum signal includes relatively low frequency phase shift keyed information encoded thereon;
    said step i) of correlating further including squaring said correlation product to remove the phase shift keyed information from said correlation product before performing said fast Fourier transform.

14. The method of claim 12 wherein said step ii) of determining includes detecting the degree of correlation produced by said step of fast Fourier transforming by monitoring the average power in the output of said correlation produced by said fast Fourier transform.

15. The method of claim 14 wherein said step i) of correlating is performed N times for a single selected multibit sample, where N is an integer, and detecting the presence of a match when the monitored average power is above a selected level M times out of N, where M is an integer less than N.

16. The method of claim 15 wherein said step ii) of determining further comprises detecting the power in each frequency bin from the fast Fourier transform to determine the peak power thereof and determining the relative frequency at which said peak power occurs from the associated frequency bin to thereby estimate the received carrier frequency.

17. The method of claim 10 further comprising d) complex phase lock demodulating said frequency shifted carrier for recovering said information and for determining the frequency of said frequency shifted carrier.

18. The method of claim 12 wherein said step i) of correlating of said step b) of deriving, upon detection of a match, develops in-phase and quadrature portions of the despread information modulated frequency shifted carrier,
said method further comprising d) complex phase lock demodulating said frequency shifted carrier for recovering said information and for determining the frequency of said frequency shifted carrier.

19. The method of claim 18 wherein said step d) of demodulating is provided with the doppler shift frequency from said step ii) of determining as an initial estimate of the frequency of said frequency shifted carrier.

20. The method of claim 19 wherein said step d) of demodulating is performed by a Costas phase lock loop, said Costas loop determining the doppler shift of said carrier and extracting said doppler shifted carrier to produce a demodulated information signal.

21. A system of deriving information from spread spectrum positional signals modulated on a carrier frequency comprising:
mixing means for shifting the carrier frequency of said spread spectrum positional signals substantially to baseband;
demodulating means, responsive to said mixing means, for processing said spread spectrum positional signals to derive information therefrom.

22. The system of claim 21 wherein said mixing means comprises:
oscillator means for developing a mixing frequency equal to said carrier frequency;
multiplier means for in-phase and quadrature multiplying said spread spectrum positional signals with said mixing frequency.

23. The system of claim 22 wherein said multiplier means includes phase quadrature shifting means for quadrature phase shifting said mixing frequency to form a phase shifted mixing signal,
a first multiplier for multiplying said spread spectrum positional signals with said mixing frequency to form an in-phase baseband shifted spread spectrum signal component, and
a second multiplier for multiplying said spread spectrum positional signals with said phase shifted mixing signal to form a quadrature baseband shifted spread spectrum signal component.

24. The system of claim 23 further comprising filter means for separating said spread spectrum signals from the remaining radio frequency environment, said filter means performing substantially all separation of said spread spectrum signals from said radio frequency environment, said filter means consisting essentially of low pass filter means for separating said in-phase and quadrature baseband shifted signal components from higher frequency baseband shifted frequencies.

25. The system of claim 24 wherein said low pass filter means consist essentially of first and second amplifiers, operatively connected to outputs of said first and second multipliers, said amplifiers having an amplifier bandwidth closely matching the spectral density function of said spread spectrum signal.

26. The system of claim 25 further comprising A.C. coupling capacitors operatively connected between said first and second multipliers and said demodulating means for isolating said demodulating means from D.C. signal components.

27. The system of claim 22 wherein said mixing means develops in-phase and quadrature baseband shifted spread spectrum signal components;
said mixing means digitizing said in-phase and quadrature baseband shifted frequency components.

28. The system of claim 25 wherein said mixing means further include first and second analog to digital converter/multiplier means, operatively connected to the outputs of said first and second amplifiers, for multiplying said in-phase and quadrature baseband shifted spread spectrum signal components with a multibit sample of a selected spread spectrum code to produce in-phase and quadrature digital correlation products.

29. The system of claim 28 wherein each said analog to digital converter/multiplier includes,
a comparator comparing its associated baseband shifted spread signal component with a reference voltage and producing an output,
a binary multiplier multiplying the output of said comparator with the multibit sample of said selected spread spectrum code to produce a binary product, and
an up/down counter, receiving the binary product of said binary multiplier and being clocked by a frequency substantially equal to the frequency of said baseband shifted spread spectrum signal components, and producing its corresponding correlation product.

30. The system of claim 27 wherein said demodulating means performs all processing digitally.

31. The system of claim 30 wherein said processing means is primarily a standard audio digital signal processor.

32. The system of claim 27 wherein said spread spectrum positional signals include information encoded therein;
said system further comprising code generation means for identifying at least one selected spread spectrum code and developing a multibit code representative of at least a portion thereof;
said demodulator means comprising spread spectrum signal acquisition means for correlating said in-phase and quadrature baseband shifted spread spectrum signal components with said multibit code and, upon detection of a match, collapsing their information bandwidth to develop in-phase and quadrature portions of the de-spread information modulated frequency shifted carrier.

33. The system of claim 32 wherein said spread spectrum signal acquisition means includes,
single bit multiplier means for multiplying said in-phase and quadrature signal components with said multibit code to produce a correlation product indicative of the degree of correlation therebetween,
digital integration means, responsive to said correlation product, for reducing the bandwidth of said correlation product and for developing digitized samples thereof, and
transform means for performing a fast Fourier transform of said digitized samples to determine the degree of correlation between said multibit code and said baseband shifted in-phase and quadrature components and producing an output representative thereof.

34. The system of claim 33 wherein said spread spectrum acquisition means further comprises means for determining the presence of an initial match between said a said selected spread spectrum code and the spreading code used to modulate a said spread spectrum positional signal when the output of said fast Fourier transform is above a threshold.

35. The system of claim 34 wherein said means for determining additionally determines the relative frequency at which said initial match occurs, said relative frequency being an initial estimate of the frequency of the frequency shifted carrier which corresponds to the doppler shift frequency related to the relative velocity between the transmitter and the receiver of the spread spectrum positional signal.

36. The system of claim 35 wherein said demodulating means further comprises information demodulation and signal locking means, receiving said de-spread information modulated frequency shifted carrier, for phase locking to said frequency shifted carrier, for demodulating said data, and for determining any doppler frequency shift of said carrier.

37. The system of claim 36 wherein said information demodulation and signal locking means includes,
complex phase lock loop means for receiving said despread information modulated frequency shifted carrier and for multiplying it with a complex frequency of the carrier to recover the information therefrom.

38. The system of claim 37 wherein said complex phase lock loop means is a Costas loop for phase demodulating said de-spread information modulated frequency shifted carrier, said complex frequency being $e_{-j\omega}$, where $\omega$ is the doppler frequency shift of said carrier.

39. The system of claim 38 wherein said Costas loop utilizes a numerically controlled digital oscillator.

40. The system of claim 35 wherein said information within said spread spectrum signal is phase shift keyed, said means for determining comprising squaring means for squaring said digitized samples of said correlation product to remove the phase shift keyed information therefrom before supplying said samples to said fast Fourier transform.

41. The system of claim 35 wherein said means for determining comprises power squaring means for squaring each frequency related output of said fast Fourier transform to obtain a value representative of the power spectrum thereof.

42. The system of claim 41 wherein said means for determining further comprises average power monitoring means for determining the average power output by said fast Fourier transform for each said correlation product, said average power monitoring means establishing that a match between said multibit code and said spreading code used to modulate said spread spectrum positional signal has occurred.

43. The system of claim 42 wherein said transform means and means for determining repeatedly determine the degree of correlation between said multibit code and said in-phase and quadrature components N times for a single selected multibit sample, where N is an integer;
said means for determining determining the presence of a match when the monitored average power is above a selected level M times out of N, where M is an integer less than N.

44. The system of claim 43 wherein said means for determining further includes peak power detecting means, responsive to the detection of a match by said average power monitoring means, for determining which frequency related output of said fast Fourier transform has a peak power output to thereby determine an estimate of the carrier frequency.

45. The system of claim 44 wherein said demodulating means further comprises information demodulation and signal locking means, receiving said de-spread information modulated frequency shifted carrier, for phase locking to said frequency shifted carrier, for demodulating said data, and for determining any doppler frequency shift of said carrier.

46. The system of claim 45 wherein said information demodulation and signal locking means includes,
complex phase lock loop means for receiving said despread information modulated frequency shifted carrier and for multiplying it with a complex frequency of the carrier to recover the information therefrom.

47. The system of claim 46 wherein said complex phase lock loop means is a Costas loop for phase demodulating said de-spread information modulated frequency shifted carrier, said complex frequency being $e^{-j\omega}$, where $\omega$ is the doppler frequency shift of said carrier.

48. The system of claim 47 wherein said Costas loop utilizes a numerically controlled digital oscillator.

49. The system of claim 47 wherein said estimate of carrier frequency developed by said peak power detecting means is used as the initial estimate of $\omega$.

50. The method of claim 1 wherein said spread spectrum positional signals are generated by at least one Global Positioning System (GPS) satellite or GLONASS satellite.

51. The system of claim 21 wherein said spread spectrum positional signals are generated by at least one Global Positioning System (GPS) satellite or GLONASS satellite.

52. A method of deriving information from spread spectrum positional signals comprising:
frequency shifting said spread spectrum positional signals to a lower frequency range;
separating said spread spectrum positional signals from the radio frequency environment using only lowpass filtering; and deriving information from said frequency shifted spread spectrum positional signals using said standard audio digital signal processing techniques.

53. The method of claim 52 wherein said method is performed with a standard audio digital signal processor.

54. A system of deriving information from spread spectrum positional signals modulated on a carrier frequency comprising:
- mixing means for shifting the carrier frequency of said spread spectrum positional signals to a lower frequency range;
- means for separating said spread spectrum positional signals, received from said mixing means, from the radio frequency environment, said means for separating consisting essentially of means for low pass filtering;
- demodulating means, responsive to said means for separating, for processing said spread spectrum positional signals to derive information therefrom.

55. A method of deriving information from spread spectrum positional signals, said spread spectrum positional signals having a carrier frequency and an information bandwidth $BW_T$ comprising:
- frequency shifting said spread spectrum positional signals by shifting said carrier frequency to a new frequency less than $BW_T/2$;
- deriving said information from said frequency shifted spread spectrum positional signals using said standard audio digital signal processing techniques.

56. The method of claim 55 wherein said digital signal processing techniques are performed by a standard audio digital signal processor.

57. A system of deriving information from spread spectrum positional signals having a carrier frequency and an information bandwidth $BW_T$ comprising:
- mixing means for shifting the carrier frequency of said spread spectrum positional signals to a new frequency less than $BW_T/2$;
- demodulating means, responsive to said mixing means, for processing said spread spectrum positional signals to derive information therefrom.

* * * * *